United States Patent
Chiang et al.

(10) Patent No.: US 7,605,612 B1
(45) Date of Patent: Oct. 20, 2009

(54) TECHNIQUES FOR REDUCING POWER REQUIREMENTS OF AN INTEGRATED CIRCUIT

(75) Inventors: Owen Chiang, Austin, TX (US); Christopher M. Durham, Round Rock, TX (US); Peter J. Klim, Austin, TX (US); Daniel L. Stasiak, Austin, TX (US); Albert J. Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/121,827

(22) Filed: May 16, 2008

(51) Int. Cl.
*H03K 19/00* (2006.01)
(52) U.S. Cl. .................. 326/93; 326/136; 327/544; 713/322
(58) Field of Classification Search ............. 326/93–98; 327/544
See application file for complete search history.

(56) References Cited

U.S. PATENT DOCUMENTS 5,583,450 A * 12/1996 Trimberger et al. ........... 326/41
6,636,074 B2 * 10/2003 Schulz ......................... 326/93
7,095,251 B2 * 8/2006 Wilcox et al. ................ 326/93

\* cited by examiner

*Primary Examiner*—James Cho
(74) *Attorney, Agent, or Firm*—Dillon & Yudell LLP

(57) ABSTRACT

A technique for clock gating a clock domain of an integrated circuit includes storing first, second, and third values in a control register. The first value corresponds to a first number of clock cycles to wait before initiating clock gating, the second value corresponds to a second number of clock cycles in which clock gating is performed, and the third value corresponds to a third number of clock cycles in which clock gating is not performed. One of the first, second, and third values is selectively loaded from the control register into a counting circuit. The counting circuit counts from the loaded one of the first, second, and third values to a transition value. A compare signal is received at the control state machine (from the counting circuit) that indicates the counting circuit has reached the transition value. Based on a current state of the control state machine, a load signal is provided to the counting circuit to cause the counting circuit to load an associated one of the first, second, and third values from the control register.

20 Claims, 5 Drawing Sheets

| Enable | Present State a | Present State b | Compare to Zero | New State a | New State b | Clock Enable | Load Decr. | Decr. Value |
|---|---|---|---|---|---|---|---|---|
| 0 | x | x | x | 1 | 1 | 1 | 0 | x |
| 1 | 0 | 0 | 0 | 0 | 0 | 1 | 0 | <m |
| 1 | 0 | 0 | 1 | 0 | 1 | 0 | 1 | n |
| 1 | 0 | 1 | 0 | 0 | 1 | 0 | 0 | <n |
| 1 | 0 | 1 | 1 | 1 | 0 | 1 | 1 | o |
| 1 | 1 | 0 | 0 | 1 | 0 | 1 | 0 | <o |
| 1 | 1 | 0 | 1 | 0 | 0 | 1 | 1 | m |
| 1 | 1 | 1 | x | 0 | 0 | 1 | 0 | m |

FIG. 3

TECHNIQUES FOR REDUCING POWER REQUIREMENTS OF AN INTEGRATED CIRCUIT

BACKGROUND

1. Field

This disclosure relates generally to an integrated circuit and, more specifically, to techniques for reducing power requirements of an integrated circuit.

2. Related Art

As technologies become have become more bounded by packaging and applications, increased power requirements have become a problem for designers of complex very large scale integrated (VLSI) chips. To meet performance demands, designers have (in many cases) increased a clock frequency of a chip and/or increased design complexity of the chip. However, as clock frequency and complexity of chip designs have increased, power requirements have also generally increased. Unfortunately, many popular applications (such as hand-held devices like personal digital assistants (PDAs), cellular telephones, MP3 players, etc., that are battery-powered) require low-power operation. As a result, designers are faced with goals that are usually mutually exclusive, i.e., increase performance (which usually requires increased complexity and/or increased clock speed) of a chip while reducing power requirements of the chip.

There are various conventional approaches that have been implemented to reduce power dissipation of a chip. For example, at least some chip designs have limited a clock frequency of a chip. Others chip designs have employed low-power circuitry, which tends to be slower in operation (which limits a maximum clock frequency that can be used to clock a chip). Still other chip designs have employed power throttling techniques to reduce power dissipation of a chip by selectively deactivating portions of the chip that are not used and/or are consuming significant amounts of power. For example, U.S. Pat. No. 6,785,826 (hereinafter the '826 patent) describes a technique for throttling chip partitions based on measured local power dissipation. Another power throttling technique compares input and output states of a given register and selectively gates a corresponding clock signal based on the states of the register.

SUMMARY

According to one aspect of the present disclosure, a clock gating system includes a control register, a counting circuit, and a control state machine. The control register is configured to store multiple values that include first, second, and third values. In this case, the first value corresponds to a first number of clock cycles to wait before initiating clock gating, the second value corresponds to a second number of clock cycles in which clock gating is performed, and the third value corresponds to a third number of clock cycles in which clock gating is not performed. The counting circuit is coupled to the control register and is configured to selectively load one of the first, second, and third values from the control register and count from the loaded one of the first, second, and third values to a transition value. The control state machine is coupled to the counting circuit and is configured to receive a compare signal from the counting circuit that indicates the counting circuit has reached the transition value. Based on a current state of the control state machine, a load signal is provided to the counting circuit to cause the counting circuit to load an appropriate one of the first, second, and third values from the control register when an enable signal is asserted.

According to another aspect of the present disclosure, a technique for clock gating a clock domain of an integrated circuit includes storing first, second, and third values in a control register. The first value corresponds to a first number of clock cycles to wait before initiating clock gating, the second value corresponds to a second number of clock cycles in which clock gating is performed, and the third value corresponds to a third number of clock cycles in which clock gating is not performed. One of the first, second, and third values is selectively loaded from the control register into a counting circuit. The counting circuit counts from the loaded one of the first, second, and third values to a transition value. A compare signal is received at the control state machine (from the counting circuit) that indicates the counting circuit has reached the transition value. Based on a current state of the control state machine, a load signal is provided to the counting circuit to cause the counting circuit to load an associated one of the first, second, and third values from the control register.

According to another embodiment of the present disclosure, a technique for clock gating a clock domain of an integrated circuit includes storing first, second, and third values in a control register. The first value corresponds to a first number of clock cycles to wait before initiating clock gating, the second value corresponds to a second number of clock cycles in which clock gating is performed, and the third value corresponds to a third number of clock cycles in which clock gating is not performed. One of the first, second, and third values is selectively loaded from the control register into a counting circuit. The counting circuit then counts from the loaded one of the first, second, and third values to a transition value. A control state machine then receives a compare signal from the counting circuit when the counting circuit reaches the transition value. Based on a current state of the control state machine, a load signal is provided to the counting circuit to cause the counting circuit to load an associated one of the first, second, and third values from the control register while an associated enable signal is asserted.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

FIG. 3 is a state table for the control state machine of FIG. 1.

DETAILED DESCRIPTION

Figure 1:
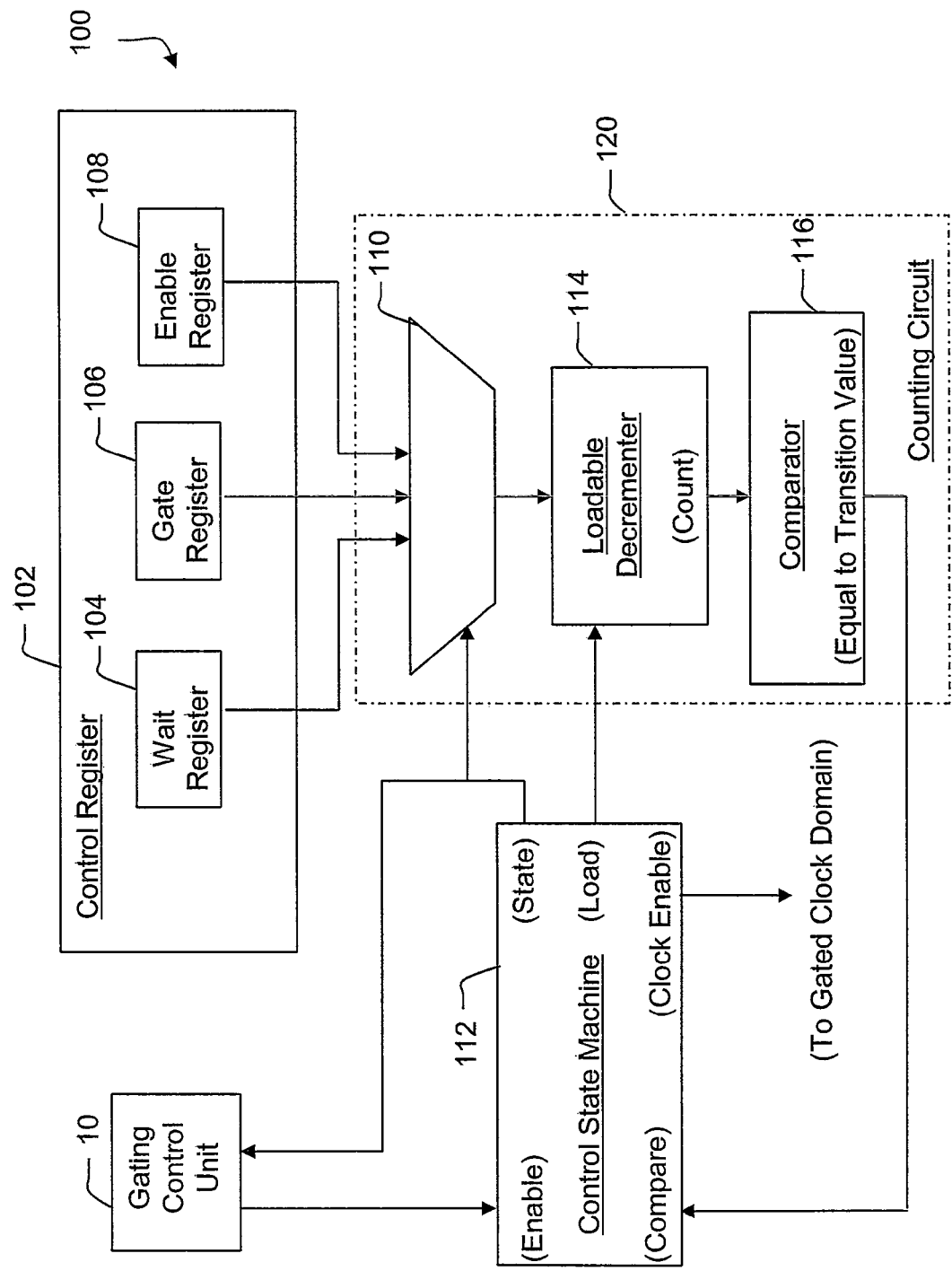
FIG. 1 is a block diagram of a clock gating system (that includes a control state machine), configured according to an embodiment of the present disclosure.

As will be appreciated by one of ordinary skill in the art, the present invention may be embodied as a method, system, device, or computer program product. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module," or "system." For example, the present invention may take the form of one or more design files included in a computer program product on a computer-usable storage medium having computer-usable program code embodied in the medium.

Any suitable computer-usable or computer-readable storage medium may be utilized. The computer-usable or computer-readable storage medium may be, for example, but is not limited to an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM) or Flash memory, a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable storage medium may be any medium that can contain or store a program for use by or in connection with an instruction execution system, apparatus, or device. As used herein, the term "coupled" includes both a direct electrical connection between blocks or components and an indirect electrical connection between blocks or components achieved using intervening blocks or components.

According to various aspects of the present disclosure, power dissipation of an integrated circuit (chip) is reduced by dynamically allocating/configuring clock gating for various chip partitions (clock domains). The clock domains may correspond to, for example, different processor cores of a multi-core processor chip. According to one aspect of the present disclosure a gating control unit (such as an instruction dispatch unit, power throttling system, etc.) is configured to selectively drive (by providing an enable signal to a control state machine) a given clock domain of a chip into a powered-down mode using clock gating. In general, a clock gating system, configured according to the present disclosure, includes three operation modes that repeat providing an enable signal is asserted.

In a first operation mode, gating activity is delayed for a programmable number of clock cycles 'm' in order to permit the gate control unit to gather necessary state before the gated clock (power-down) operation begins. In the second operation mode, clock gating occurs for a second programmable number of clock cycles 'n'. In a third operation mode, clock gating is disabled for a programmable number of clock cycles 'o'. From any state, the system enters a stall state, where no clock gating operations occur, when the gating control unit deasserts the enable signal. According to one or more aspects of the present disclosure, all gating values (i.e., 'm', 'n', and 'o') are programmable to permit maximum flexibility for the gating control unit. In general, the dynamically programmable/configurable clock gating system (or power throttling mechanism) employs clock gating for some of the clock cycles of a partition or sub-unit of a given chip to reduce power. The number of gated clock cycles can be dynamically or statically programmed for a given number of total clock cycles.

A block diagram of an example programmable/configurable clock gating system 100, which is configured according to the present disclosure, is illustrated in FIG. 1. As is illustrated in FIG. 1, the system 100 includes a control register 102, a counting circuit 120 (which includes a 3:1 multiplexer 110, a loadable decrementer 114, and a comparator 116) and a control state machine 112. The control register 102 includes a wait register 104, a gate register 106, and an enable register 108. The registers 104-108 hold the amount of time (in clock cycles) for each of three states of the system 100. The multiplexer 110 selects one of the registers 104-108 to supply a value to be used in the decrementer 114 based on a state output of the control state machine 112. In various embodiments, the decrementer 114 counts from the loaded value to a transition value, e.g., zero. It should be appreciated that the transition value may be assigned a value other than zero. Moreover, the counting circuit 120 may be configured to increment, instead of decrement. The comparator 116 includes an input that is coupled to a count output of the decrementer 114. The comparator 116 detects when the decrementer 114 reaches the transition value and asserts an equal signal that is provided to a compare input of the control state machine 112.

The control state machine 112 controls loading/operation of the decrementer 114, maintains the state of the system 100, and reports the state of the system 100 to a gating control unit 10. The system 100 sends and receives information from the gating control unit 10, which is used to control the power gating operation and provide the values for the control registers 104-108. When the gating control unit 10 asserts an enable signal (provided to the enable input of the control state machine 112), the system 100 operates normally. When the enable signal is deasserted, the control state machine 112 stalls and stops all clock gating operations. As noted above, the control state machine 112 signals a current state to the gating control unit 10, informing the gate control unit 10 of the status/state of the clock gating system 100.

Figure 2:
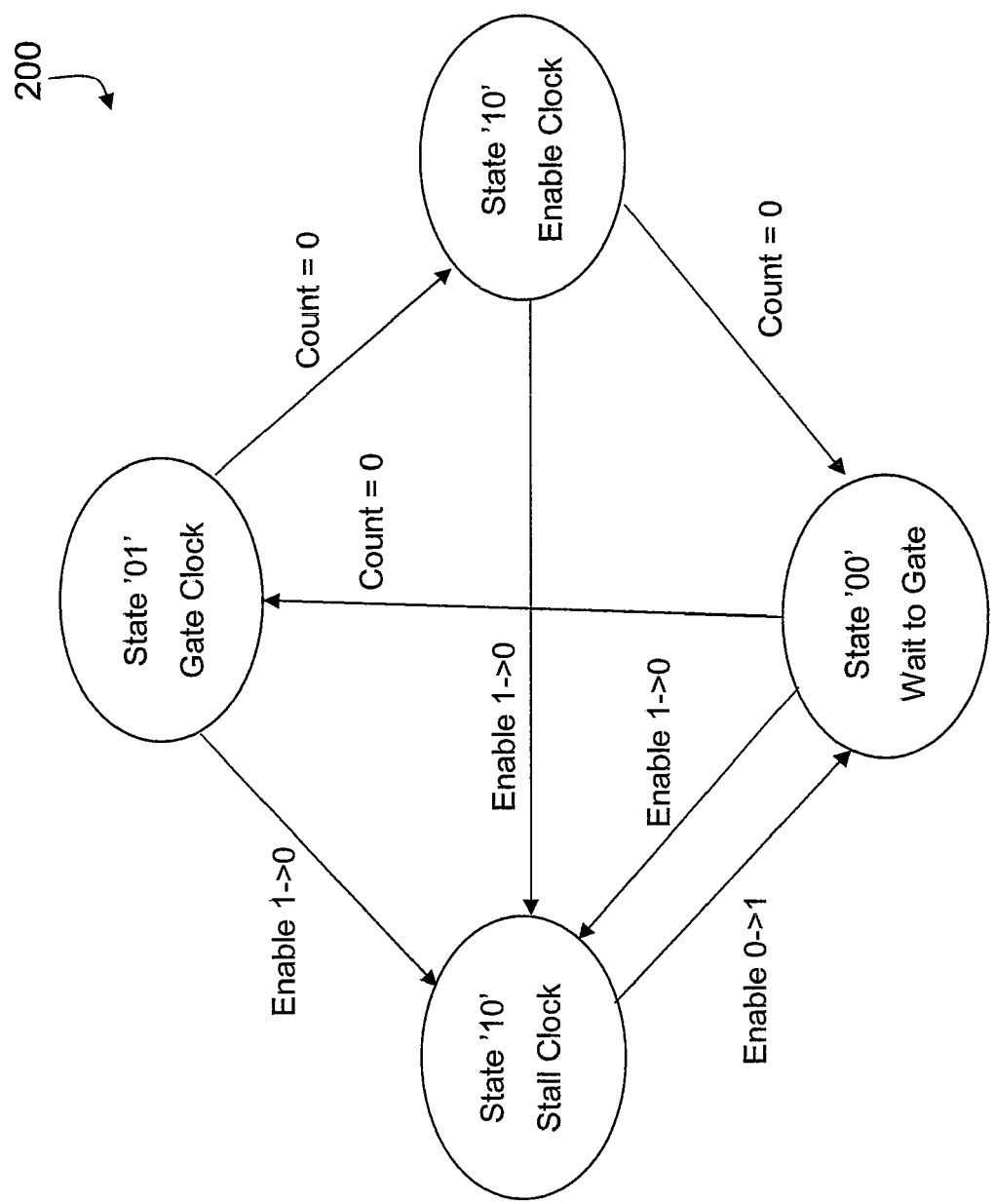
FIG. 2 is a state diagram for the control state machine of FIG. 1.

With reference to FIG. 2, the operation of the system 100 is shown in state diagram 200. As shown in FIG. 2, there are four states (i.e., state '00', state '01', state '10', and state '11') for the system 100. In state '00' (i.e., a wait to gate state), the system 100 waits a number of cycles, set by the value 'm', before clock gating operation begins. This is desirable as the gating control unit 10 may, for example, require some finite number of cycles after asserting the enable signal before actual clock gating occurs. When the '00' state is entered, the clock is enabled to the gated circuitry (operational) and the decrementer 114 is loaded with the value 'm'. The '00' state continues until the decrementer 114 reaches the transition value, at which time the control state machine 112 transitions to a state '01' (i.e., a gate clock state). It should be noted that if at any time the enable signal is deasserted (e.g., makes a 1→0 transition) in state '00', state '01', or state '10', the state machine 112 immediately enters the '11' state (i.e., a stall gate state).

During normal operation, when the machine 112 is in the '01' state, the clock to the circuitry is disabled (gated) and the decrementer 114 is loaded with a value 'n', which corresponds to the number of cycles to gate the clock. The state machine 112 stays in the '01' state until the decrementer 114 counts to the transition value, at which time the state machine 112 transitions to the '10' state (i.e., an enable clock state). When the '10' state is entered, the decrementer 114 is loaded with the value 'o', which represents the number of cycles the clock should be enabled before the power gating operation sequence restarts. When the state machine 114 enters the '10' state, the clock is enabled (un-gated) and the decrementer 114 is loaded with the value 'o'. When the decrementer 114 counts from the value 'o' to transition value, the machine 112 transitions to the state '00'. As noted above the '11' state (i.e., the stall gate state) is entered at any time the enable is de-asserted by the gating control unit 10. During the '11' state, the clock is enabled (power gating is disabled) and the state machine 112 awaits for the gating control unit 10 to once again permit clock gating to occur. This is desirable for operations in which it is undesirable for clock gating to occur, such as during system debug, correlations, etc. It should be appreciated that different transition values may be employed for the different states, if desired.

In the disclosed embodiment, the total number of clock cycles in a complete clock gating sequence is equal to 'm'+'n'+'o', where 'm' is the number of clock cycles to wait before gating after entering a power gating sequence, 'n' is the number of clock cycles to gate the clock, and 'o' is the number of clock cycles to enable the clock before repeating the clock gating sequence. The overall percentage of cycles to gate can be represented by:

$$\% \text{ Cycles Gated} = m/(\text{Total Cycles}) = [m/(m+n+o)] * 100\%$$

To set the percentage of cycles gated, the control registers can be programmed using various techniques. For example, the control registers may be configured in dynamic, scan, or static modes.

In dynamic configurations, the register values are set by a system operation, such as information from the gating control unit 10 of FIG. 1. In typical operation, the register values are set when the enable signal is deasserted (gating not allowed). In general, dynamic configuration permits the system 100 to be adapted to changing environmental conditions (such as temperature, power, system usage, etc.) to set each of the three count states. For example, the values can be determined according to various criteria, e.g., temperature sensing of localized areas, maximum current measurement/sensing from partitions, voltage gradients, etc. Moreover, various criteria can be used to determine look-up values stored in a read-only memory (ROM). Scan configurations allow register values to be set using sequential scan (e.g., test and power-on) operations. Employing scan configuration allows a default or initial state to be loaded into the system 100. It should be noted that the scan mode does not preclude also using the dynamic mode. Static configuration denotes the case where a constant value is desired to be used for the clock gating values. While static configuration precludes programmability of the system, static configuration may be useful when multiple instances of the power gating system are used in consistently known environments.

As noted above, the data from the registers 104-108 are directed to the loadable decrementer 114 by the multiplexer 110. The decrementer 114 is used to count from each state ('m', 'n', or 'o') to the transition value. The decrementer 114 may include, for example, a 2:1 multiplexer, a k-bit register, and a k-bit decrementer. In this configuration, the 2:1 multiplexer selects between data from the multiplexer 110 or the k-bit decrementer. When the control state machine 112 asserts the load signal, the decrementer 114 selects the data provided by the multiplexer 110. When the load signal is deasserted, the decrementer 114 selects the k-bit decrementer data. The output of the 2:1 multiplexer is stored in the k-bit register, where 'k' is at least equal to the maximum of the control register width. The k-bit register output is decremented each cycle via the k-bit decrementer. The output of the k-bit decrementer is compared to the transition value via the comparator 116. The comparator 116 may determine when the decrementer 114 reaches the transition value by employing a NOR gate. In this case, the NOR gate provides an asserted equal signal (e.g., a digital one) when all the k-bit decrementer bits are, in this case, zero.

An example state table 300 for the control state machine 112 is shown in FIG. 3. It should be noted that when the enable signal is zero, the machine 112 enters the '11' state (the stall gate state) regardless of the previous state. In the '11' state, all gating operations cease, the clock gating system is disabled (i.e., the clock is enabled), the decrementer 114 is not loaded, and the value of the decrementer 114 is unused (don't care).

Figure 4:
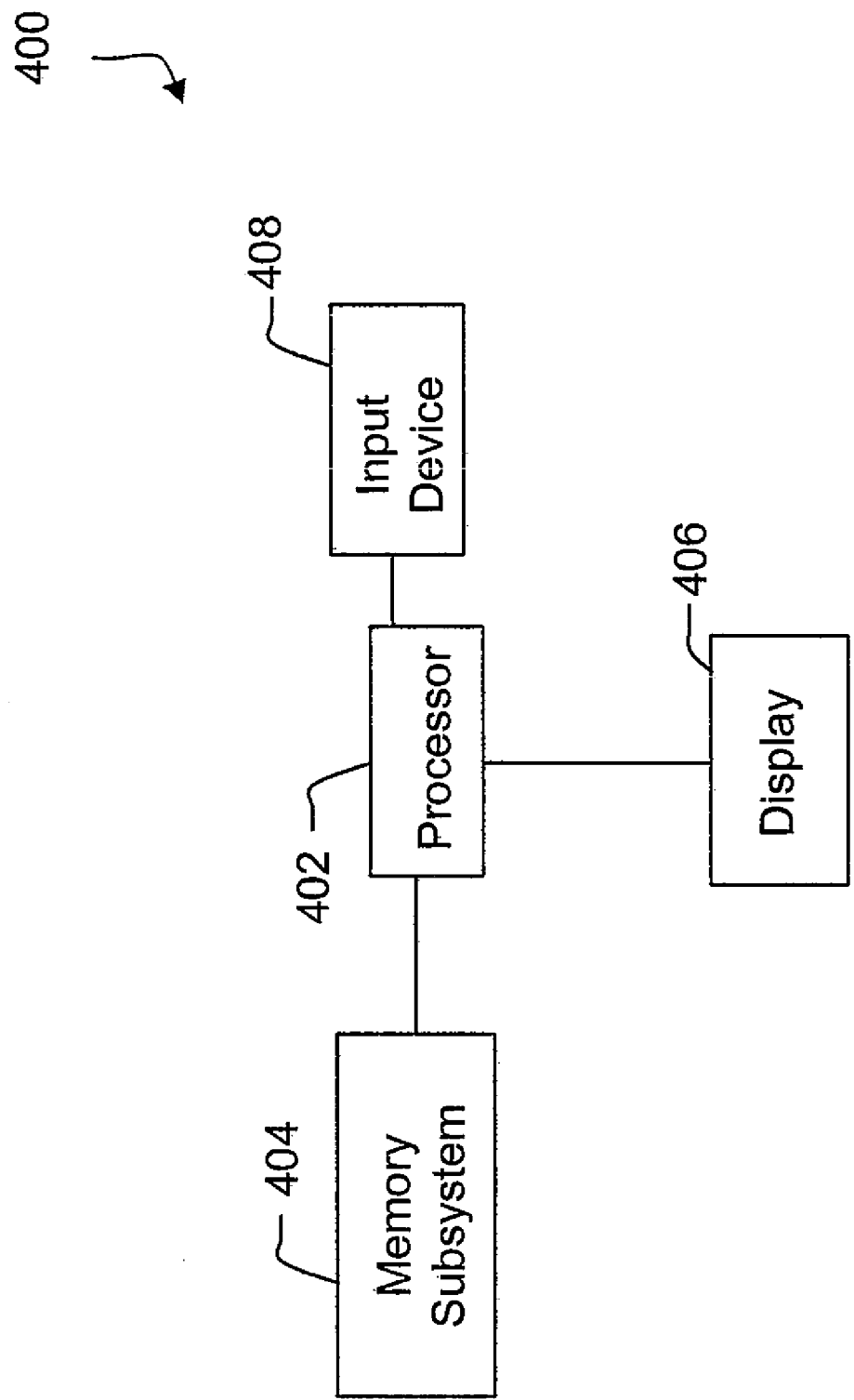
FIG. 4 is a block diagram of an example computer system that may be configured to include one or more clock gating systems configured according to FIG. 1.

With reference to FIG. 4, an example computer system 400 is illustrated that may include one or more clock gating systems configured according to various embodiments of the present disclosure. The computer system 400 includes a processor 402 that is coupled to a memory subsystem 404, a display 406, and an input device 408. The processor 402 may include, for example, multiple processor cores that are each serviced by a clock gating system configured according to the present disclosure. The memory subsystem 404 includes an application appropriate amount of volatile memory (e.g., dynamic random access memory (DRAM)) and non-volatile memory (e.g., read-only memory (ROM)). The display 406 may be, for example, a cathode ray tube (CRT) or a liquid crystal display (LCD). The input device 408 may include, for example, a mouse and a keyboard. The processor 402 may also be coupled to one or more mass storage devices, e.g., a compact disc read-only memory (CD-ROM) drive.

Figure 5:
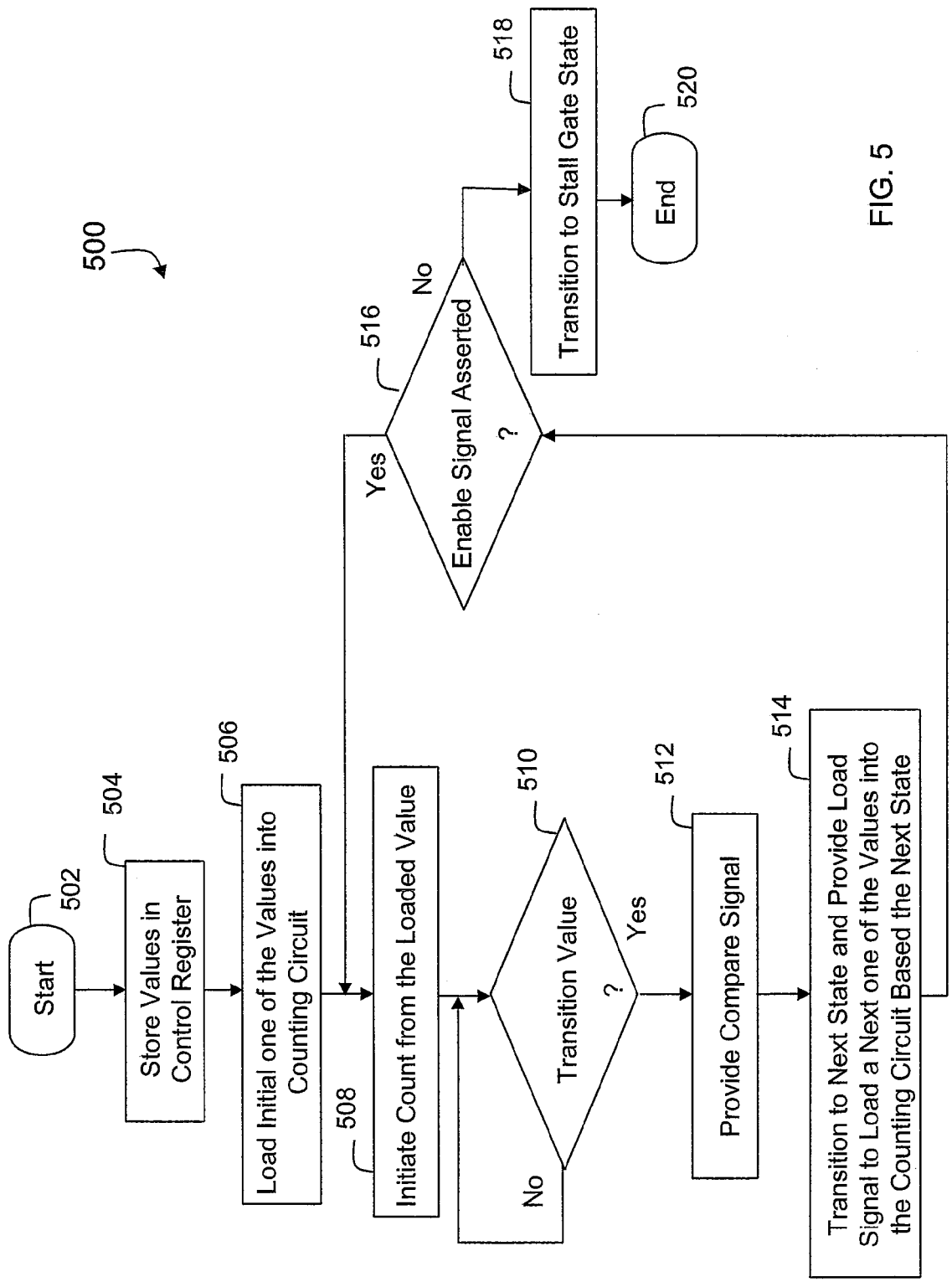
FIG. 5 is a flowchart of an example process for performing clock gating according to an embodiment of the present disclosure.

With reference to FIG. 5, an example process 500 for operating a clock gating system, according to an embodiment of the present disclosure, is illustrated. In block 502, the process 500 is initiated at which point control transfers to block 504. In block 504, multiple values are stored in the control register 102. As noted above, the values include a first value that corresponds to a first number of clock cycles to wait before initiating clock gating, a second value that corresponds to a second number of clock cycles in which clock gating is performed, and a third value that corresponds to a third number of clock cycles in which clock gating is not performed.

It should be appreciated that the values may be stored in different registers or different portions of a single register. Next, in block 506, an initial one of the values is loaded into the counting circuit 120. Then, in block 508, a count (beginning at the loaded value) is initiated. Next, in decision block 510 it is determined whether a transition value (e.g., zero) has been reached. If the transition value is reached in block 510 control transfers to block 512, where a compare signal is provided from the circuit 120 to the control state machine 112. If the transition value is not reached in block 510, control loops on block 510 until the transition value is reached. From block 512, control transfers to block 514 where the control state machine 112 transitions to a next state and provides a load signal to the counting circuit 120 to cause the circuit 120 to load a next one of the values into the decrementer 114 based on the next state. Next, in decision block 516, it is determined whether the enable signal is still asserted.

If the enable signal is asserted in block 516, control transfers to block 508. If the enable signal is not asserted in block 516, control transfers to block 518, where the control state machine 112 transitions to a stall gate state (in which clock gating is disabled). Following block 518, control transfers to block 520, where the process 500 terminates. Accordingly, techniques have been disclosed herein that facilitate power reduction in an integrated circuit through implementation of clock gating.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A clock gating system, comprising:
   a control register configured to store multiple values, the multiple values including first, second, and third values, wherein the first value corresponds to a first number of clock cycles to wait before initiating clock gating, the second value corresponds to a second number of clock cycles in which clock gating is performed, and the third value corresponds to a third number of clock cycles in which clock gating is not performed;
   a counting circuit coupled to the control register, wherein the counting circuit is configured to selectively load one of the first, second, and third values from the control register and count from the loaded one of the first, second, and third values to a transition value; and
   a control state machine coupled to the counting circuit, wherein the control state machine is configured to receive a compare signal from the counting circuit that indicates the counting circuit has reached the transition value and, based on a current state of the control state machine, provide a load signal to the counting circuit to cause the counting circuit to load an appropriate one of the first, second, and third values from the control register when an enable signal is asserted.

2. The clock gating system of claim 1, where the first, second, and third values are stored in different registers within the control register.

3. The clock gating system of claim 1, where the counting circuit includes a multiplexer that selects one of the first, second, and third values based on the current state of the control state machine.

4. The clock gating system of claim 3, wherein the counting circuit includes a decrementer that is configured to load the selected one of the first, second, and third values and count down from the selected one of the first, second, and third values to the transition value.

5. The clock gating system of claim 4, wherein the counting circuit includes a comparator that compares a current value of the decrementer to the transition value and asserts the compare signal when the current value is equal to the transition value.

6. The clock gating system of claim 1, wherein the control state machine includes four different states.

7. The clock gating system of claim 6, wherein the control state machine is configured to enter a stall state that disables clock gating when the enable signal is deasserted.

8. A method for clock gating a clock domain of an integrated circuit, comprising:
   storing first, second, and third values in a control register, wherein the first value corresponds to a first number of clock cycles to wait before initiating clock gating, the second value corresponds to a second number of clock cycles in which clock gating is performed, and the third value corresponds to a third number of clock cycles in which clock gating is not performed;
   selectively loading one of the first, second, and third values from the control register into a counting circuit;
   counting, using the counting circuit, from the loaded one of the first, second, and third values to a transition value;
   receiving, at a control state machine, a compare signal from the counting circuit that indicates the counting circuit has reached the transition value; and
   providing, based on a current state of the control state machine, a load signal to the counting circuit to cause the counting circuit to load an associated one of the first, second, and third values from the control register.

9. The method of claim 8, further comprising:
   receiving, at the control state machine, an asserted enable signal, wherein the asserted enable signal, allows the control state machine to transition between states.

10. The method of claim 8, wherein the first, second, and third values are stored in different registers within the control register.

11. The method of claim 8, further comprising:
   selecting, with a multiplexer included in the counting circuit, one of the first, second, and third values based on the current state of the control state machine.

12. The method of claim 11, further comprising:
   loading a decrementer, included in the counting circuit, with the selected one of the first, second, and third values; and counting down from the selected one of the first, second, and third values to the transition value.

13. The method of claim 12, further comprising;

comparing, with a comparator included in the counting circuit, a current value of the decrementer to the transition value; and asserting the compare signal when the current value is equal to the transition value.

14. The method of claim 8, wherein the control state machine includes four different states.

15. The method of claim 14, further comprising:

disabling clock gating when the enable signal is deasserted.

16. A method for clock gating a clock domain of an integrated circuit, comprising:

storing first, second, and third values in a control register, wherein the first value corresponds to a first number of clock cycles to wait before initiating clock gating, the second value corresponds to a second number of clock cycles in which clock gating is performed, and the third value corresponds to a third number of clock cycles in which clock gating is not performed;

selectively loading one of the first, second, and third values from the control register into a counting circuit;

counting, using the counting circuit, from the loaded one of the first, second, and third values to a transition value;

receiving, at a control state machine, a compare signal from the counting circuit that indicates the counting circuit has reached the transition value; and providing, based on a current state of the control state machine, a load signal to the counting circuit to cause the counting circuit to load an associated one of the first, second, and third values from the control register while an associated enable signal is asserted.

17. The method of claim 16, further comprising:

selecting, with a multiplexer included in the counting circuit, one of the first, second, and third values based on the current state of the control state machine.

18. The method of claim 17, further comprising:

loading a decrementer, included in the counting circuit, with the selected one of the first, second, and third values; and counting down from the selected one of the first, second, and third values to the transition value.

19. The method of claim 18, further comprising;

comparing, with a comparator included in the counting circuit, a current value of the decrementer to the transition value; and asserting the compare signal when the current value is equal to the transition value.

20. The method of claim 19, further comprising:

disabling clock gating when the enable signal is deasserted.

* * * * *